(12) United States Patent
Brinkhuis

(10) Patent No.: US 8,207,268 B2
(45) Date of Patent: Jun. 26, 2012

(54) POLYUREA PRODUCT AS THIXOTROPIC RHEOLOGY MODIFYING AGENT

(75) Inventor: Richard Hendrikus Gerrit Brinkhuis, Zwolle (NL)

(73) Assignee: Nuplex Resins B.V., Bergen Op Zoom (NL)

(*) Notice: Subject to any disclaimer, the term of this patent is extended or adjusted under 35 U.S.C. 154(b) by 933 days.

(21) Appl. No.: 11/988,074

(22) PCT Filed: Jun. 28, 2006

(86) PCT No.: PCT/EP2006/006250
§ 371 (c)(1),
(2), (4) Date: Mar. 14, 2008

(87) PCT Pub. No.: WO2007/000335
PCT Pub. Date: Jan. 4, 2007

(65) Prior Publication Data
US 2010/0137453 A1 Jun. 3, 2010

(30) Foreign Application Priority Data
Jun. 28, 2005 (EP) .................................. 05105763

(51) Int. Cl.
*C08F 8/30* (2006.01)
(52) U.S. Cl. ........ 525/128; 525/123; 525/125; 525/131; 525/458; 525/459; 528/49; 528/52; 528/53; 528/85; 524/186; 524/210; 524/211; 524/212; 524/213; 252/183.11

(58) Field of Classification Search ................... 524/212, 524/210, 211, 213, 186; 252/183.11; 528/49, 528/52, 53, 85; 525/123, 125, 128, 131, 525/458, 459
See application file for complete search history.

(56) References Cited

U.S. PATENT DOCUMENTS

| | | | | |
|---|---|---|---|---|
| 3,620,695 A * | 11/1971 | McCoy | ........................... | 44/270 |
| 4,165,329 A * | 8/1979 | Dreher et al. | ................. | 554/106 |
| 4,311,622 A | 1/1982 | Buter | | |
| 4,677,028 A | 6/1987 | Heeringa et al. | | |
| 5,571,623 A * | 11/1996 | Kuriyama et al. | ............ | 428/463 |
| 6,649,706 B1 * | 11/2003 | Heid et al. | ..................... | 525/452 |
| 7,053,313 B2 * | 5/2006 | Hahn et al. | ..................... | 174/256 |
| 7,576,151 B2 * | 8/2009 | Brinkhuis et al. | ............. | 524/212 |
| 2004/0127674 A1 * | 7/2004 | Haubennestel et al. | ........ | 528/61 |
| 2006/0289828 A1 * | 12/2006 | Brinkhuis et al. | ....... | 252/183.11 |

FOREIGN PATENT DOCUMENTS
EP 1396510 A 3/2004
WO WO 2005/005557 A 1/2005

OTHER PUBLICATIONS

"International Search Report and the Written Opinion of the International Searching Authority", mailed Sep. 13, 2006, for PCT International Application No. PCT/EP2006/006250.

\* cited by examiner

*Primary Examiner* — Milton I Cano
*Assistant Examiner* — Michael L Leonard
(74) *Attorney, Agent, or Firm* — Caroline J. Haitjema; David P. Owen; Hoyng Monegier LLP

(57) ABSTRACT

A thixotropic agent comprising a first polyurea reaction product of a first polyisocyanate with a first amine and a second polyurea reaction product of a second polyisocyanate with a second amine different from the first polyurea reaction product precipitated in the presence of the colloidal particles of the first reaction product.

33 Claims, 8 Drawing Sheets

Compliance at 100s in creep tests at 0.5Pa

POLYUREA PRODUCT AS THIXOTROPIC RHEOLOGY MODIFYING AGENT

This application is a 35 U.S.C. §371 national phase application of International Application Number PCT/EP2006/006250, filed Jun. 28, 2006, and claims priority to European Patent Application No. 05105763.6, filed Jun. 28, 2005, the entire contents of both of which are incorporated by reference herein.

FIELD OF THE INVENTION

The invention relates to a thixotropic agent comprising polyurea compounds and to the use of said thixotropic agent as a rheology modification agent, and in particular as a sag control agent in coating compositions. The invention further relates to sag control agent compositions, coating compositions and coatings comprising the polyurea compound as a sag control agent.

BACKGROUND OF THE INVENTION

The use of polymer coatings to protect surfaces and enhance the aesthetic and functional properties of materials is well known. These polymer coatings are typically applied to surfaces as liquid systems using techniques such as rolling, brushing, sprinkling, casting and pneumatic or electrostatic spraying.

The rheological profile of the liquid coating systems on application is typically chosen such that the coating can be applied by the method of choice without problems, flow evenly over the substrate to which is applied, allowing surface unevenness introduced by the application step, as well as unevenness from the underlying substrate, to be leveled out as much as possible to create to best final appearance. At the same time, the liquid film should not be allowed to sag or form tears for non-horizontal substrates. Such sagging tends to be particularly pronounced for thicker films of coatings and also at any localized build-up of the film, such as at edges, holes and character lines in a substrate.

There is a need to control the fluidity of the applied coating film during its liquid stage—which includes any heating cycles following application that may be used to promote curing—such that enough leveling is obtained without detrimental sagging. This is particularly true for clear coatings that are used in automotive applications for example, where obtaining extremely well-leveled films without sagging complications is of the highest importance.

Rheology modification agents are normally introduced into coating compositions to create a pseudoplastic rheology profile, to limit or prevent sagging, and/or to avoid pigment settling for pigment containing formulations, or to optimize the orientation of pigments after application (such as metallic pigments in automotive basecoats), depending on the application for which the coating is to be used.

Urea based particulate materials form a known class of materials being able to create such a pseudoplastic rheology due to reversible flocculation. For example U.S. Pat. No. 4,311,622 discloses a sag control agent comprising a polyurea precipitated in the form of micro-disperse crystals. Also, U.S. Pat. No. 4,677,028 discloses a crystalline polyurea sag control agent that may be formed either in situ in the coating composition or externally and then added to the coating composition.

The suitability of a given rheology modification agent is dependent on many factors. It should be able to create an ideal rheological profile that itself is dependent on inter alia: the shear regime associated with the method by which the liquid coating is applied to a substrate; the thickness of the coating to be applied; the orientation of the substrate with respect to the horizontal; the surface tension; the colloidal interaction between particles solvents, resins and additives; the thermal regime associated with any concomitant curing of the coating composition after application; the amount and volatility of solvents applied; the response of viscosity to loss of solvents and raise in temperature; surface tension gradients developing upon solvent evaporation; the curing rate; and, the shear forces acting on the liquid coating. The agent must also be able to create enough robustness to allow for variations in these parameters while still maintaining results close to the optimal.

In addition to the rheological profile, there are further parameters that are of relevance for coating formulations containing rheology control agents, such as the lifetime of the coating formulation before application, and very importantly, the absence of any adverse optical effects introduced by these agents like color and haze, especially for applications such as clear coatings.

In addition to the rheological performance of a coating, its optical performance is also of the utmost importance. A sag control additive must be fine enough not to create any visible disturbance (such as protrusion) when applied in thin films. For clear coat applications, no detectable haze or turbidity should be present after completion of the curing cycle, and no color formation (or yellowing) should have resulted from its presence. Again, these characteristics should not change irreversibly with storage time.

Of course, in order to limit costs and the interference with other coating properties, and also to minimize the optical effects which are proportional to the amount of SCA added, efficient sag control agents that can do their job at low concentrations would be preferred.

Although many rheology control agents are known, none can fulfill all the demands listed above, and none so for all applications.

There has been a significant focus on the use as sag control agents of polyurea compounds derived from the reaction of an isocyanate component with an amine component. Based on the aforementioned reaction, the use of different amines and/or isocyanates will yield different polyurea compounds. If these compounds are allowed to precipitate, a range of forms, sizes and surface characteristics of the resultant products could be obtained, from isotropic to anisotropic forms and from fine micro-disperse crystals to fibrous forms, with a broad range of crystal stabilities (or "melting points"). Similarly, such distinctions in colloidal characteristics could be obtained where the batches of the same amines and isocyanates are reacted under different conditions, or in a different environment. Such characteristics are determinant of the rheological and optical properties of the polyurea compounds and their stabilities to given curing regimes.

At one extreme of morphology where the polyurea compounds crystallize in long acicular or fibrous forms, coating compositions comprising these fine structures have been shown to exhibit very low amounts of flow—and concomitantly sagging—when applied to surfaces as wet films at room temperature, allowing the use of low amounts of these materials to obtain the desired sagging limit reduction. Furthermore, where they are sufficiently fine, such polyurea compounds do not cause haze in the resultant coatings even when cured under very mild conditions, i.e. even if they stay present in the final coating without (reactive) dissolution in the curing cycle.

However, some of those urea compounds that produce such fine acicular or fibrous crystalline structures are based on expensive amine raw materials (e.g. chiral amines). Equally, such crystalline structures have been shown to exhibit in general relatively low dissolution temperatures in those solvents typically employed for coating compositions such that the rheological efficiency of the polyurea compounds during curing reactions at higher temperatures may be diminished due to a too high amount of flow allowed for in the latest stages of oven curing. Such a reduced dissolution point may also lower the resistance of the polyurea compound to aggressive solvents and cross-linking reagents in the coating compositions such that, although the polyurea compound may survive applications over short time-frames, its overall shelf-life or pot-life in such coating compositions may be limited.

Considering a different morphology, many polyurea compounds that crystallize in coarser structures—such as e.g. the most commonly used urea product based on benzylamine and HDI—do not tend to exhibit low dissolution temperatures and may thereby have an enhanced shelf-life. These coarse structures may however remain visible as haze if the cross-linking agent or curing conditions are too mild. Equally detrimentally, coarser crystalline structures are not as efficient rheologically at the temperatures and shear regimes of coatings applications. This is typically compensated for by utilizing increased amounts of the polyurea compounds in the sag control agent but this can further enhance the adverse optical effects. Moreover, the high stability of these structures may prohibit any flow occurring in the coating also in the late oven stages, thus also prohibiting leveling out of late unevenness caused by shrinkage of the film, telegraphing substrate unevenness.

It is clear that a given polyurea compound having specific crystalline and colloidal characteristics will have a defined package of both advantageous and disadvantageous rheological and optical properties. Consequently, there exists a need in the art to synergistically capture the advantageous properties of different crystalline structures of polyurea compounds while minimizing the disadvantages associated with said structures.

SUMMARY OF THE INVENTION

These and other objects are achieved by the present invention which discloses a thixotropic agent comprising a first polyurea reaction product of a first polyisocyanate with a first amine and a second polyurea reaction product of a second polyisocyanate with a second amine precipitated in the presence of colloidal particles of the first reaction product.

The first and second polyurea compounds may be different in respect of their chemical identity and/or their physical structure within the templated polyurea product. Obviously, the use of different first and second amines and/or different first and second polyisocyanates as reaction products will derive chemically different first and second polyurea compounds. Equally, however, it is envisaged that significant variations in the environmental or reaction conditions employed in the derivation of the first and second polyurea compounds can manifest in different colloidal size and morphology for those compounds even though their chemical identity may be the same.

Without being bound by theory, the first polyurea compounds are formed as colloidal particles and the second polyurea compound precipitates in the presence of said particles. The surface of the first polyurea compound acts as a nucleation point for the second polyurea compound and, as a consequence, the second polyurea compound grows onto the seed formed by the first polyurea compound. Where the first colloid is very fine, the second compound can precipitate as a much finer material than it would have where the compound itself had to form nucleating polyurea particles. In extremis, the particles obtained could be portrayed as consisting of a nucleus of the first polyurea compound onto which the second polyurea reaction product solidified. Under certain conditions a core-shell structure was observed.

The thixotropic agents according to this invention may be referred to hereinafter as 'templated' polyurea products.

The templated polyurea products when acting as sag control agents (SCAs) exhibit thixotropic behaviour, combining low viscosities at the high and medium shear stresses (>5 Pa) associated with application, with high viscosities at lower shear stresses corresponding to those created by gravity in wet coating layers on non-horizontal surfaces (<1 Pa). This thixotropic character is further characterized by fast time-dependent viscosity recovery ensuring that, as the coating becomes leveled, it does not sag whilst still wet on the surface. Their thixotropic behaviour does not preclude some flow occurring at the late stages of curing, after shrinkage has occurred due to solvent loss for example; this is considered favorable for the leveling out of surface unevenness telegraphed from the underlying substrate. Furthermore these characteristics do not change significantly with storage time of the liquid coating composition.

By varying the chemical nature and the reaction conditions under which the first and second polyurea compounds are formed this allows control of the difference in colloidal characteristics of the two species that in turn permits control of the rheological and optical properties of the resultant templated urea compound.

In accordance with a preferred embodiment of the invention, the first polyurea compound is chosen such that—had it been formed under identical conditions—it would have a stronger rheology, finer structure and lower visibility than the second polyurea compound would have done under the conditions of application of coatings containing them. Preferably this is effected by selecting the first polyurea compound such that its morphology is characterized in that it has a larger specific colloidal surface area than the second polyurea compound would have done had it been formed under identical conditions. As such the colloidal particles of the first polyurea compound may be preferably anisotropic, that is they have a clear long axis—as exemplified by FIGS. 2 and 3 appended hereto—and much smaller dimensions in the direction perpendicular to that axis (hereinafter referred to as the width). In such an embodiment or otherwise, it is preferable that these colloidal particles have a width less than 200 nm, more preferably less than 100 nm and most preferably less than 50 nm.

The width of these colloidal particles determines their visibility; at such low widths the particles will be transparent and/or invisible in coating compositions comprising them. Furthermore, the visibility of the second polyurea compound, in coating compositions comprising it, is mitigated by the morphology that results from its nucleation on the anisotropic first polyurea compound; equally the transparency of the first polyurea compound can be maintained after the introduction of the second polyurea reaction product according to the invention.

In accordance with a further preferred embodiment of the invention, the first and second polyurea compounds are characterised in that, had they been produced under equivalent conditions, the first polyurea compound would have a lower melting point than the second polyurea compound. The templated crystallisation of the second polyurea compound acts to mitigate both the lower dissolution temperature of the first polyurea compound and the lower resistance of the first polyurea compound to aggressive solvents and cross-linking agents in coating compositions; the shell of the second polyurea reaction product may give some protection against the dissolution of the first polyurea reaction product core.

Preferably the ratio of the first polyurea product to the second polyurea product (by weight) in the resultant templated product is greater than 5:95, more preferably greater than 10:90 and most preferably greater than 20:80. Furthermore, preferably the ratio of the first polyurea product to the second polyurea product (by weight) in the resultant templated product is lower than 95:5, more preferably lower than 90:10 and most preferably lower than 80:20.

A further advantage of such templated polyurea compounds over simple polyurea compounds (derived from the second amine/isocyanate reaction stage only) is that the high temperature flow is improved, resulting in smoother and more glossy coating surfaces than in prior art polyurea compounds. The high temperature flow can be controlled by tuning the morphological differences between the first and second polyurea compounds, their respective melting points and the ratio in which they are used.

In accordance with a preferred embodiment of the invention, the first and second polyisocyanates are the same. In this circumstance the first and second polyurea compounds therefore comprise the same polyisocyanate building block.

In a preferred embodiment of this invention, the first amine (used to build the first polyurea compound) comprises chiral amines. The term 'chiral amine' is intended to mean an amine covalently bonded to a carbon atom, said carbon atom having three different substituents such that it is chiral. A wide range of chiral amines may also be employed in principle. Preferably the chiral amines are amines having one hydrogen atom on the carbon atoms next to the amine group and two different other substituent groups. Furthermore, it is preferable that when chiral amines are employed as said first amines they are provided in enantiomeric excess.

In principle, a wide range of amines can be employed as second amines (used to build the second reaction step polyurea compounds) in this invention. Suitable second amines are, for example, aliphatic (substituted) alkylamine such as cycloheyxlamine, butylamine, hexylamine, laurylamine, or 3-methoxypropylamine or aliphatic (alkylaryl) amines such as 2-phenylethylamine, benzylamine and 3-aminomethyl-pyridyl amine. Preferably the second amines are amines having two hydrogen atoms on the carbon next to the amine group and one other, different substituent group.

The invention also relates to the use of the templated polyurea product as a rheology modification agent. In particular such an agent may be employed in adhesives, printing inks, coatings, detergents, paper, paperboard, textiles, construction materials, engineering plastics, pigments, mining fluids, or cosmetics.

The invention further relates to the use of the templated polyurea product as a sag control agent (SCA) in a coating composition—wherein it may be dispersed in a suitable binder material—and also to those coating compositions which employ the templated polyurea compound in this fashion. The term 'sag control' is herein not intended to encompass the phenomenon of pigment settling. The templated polyurea compound used as an SCA according to the invention further has the advantage that it either seldom decreases or does not decrease at all, the gloss or brightness of the composition, especially for clear coats.

DETAILED DESCRIPTION OF THE INVENTION

The use of the prefix "poly" for polyisocyanates indicates that at least two of the mentioned functionalities are present in the respective "poly" compound. It is noted that when a polyurea product is prepared by the reaction product of amines with a polyisocyanate, it is preferred to prepare a diurea product or a triurea product. It is also noted that where a chiral amine or isocyanate is used, the polyurea reaction product that is obtained is not necessarily optically active.

The polyisocyanates are preferably selected from the group consisting of aliphatic, cycloaliphatic, aralkylene, and arylene polyisocyanates, more preferably from the group consisting of substituted or unsubstituted linear aliphatic polyisocyanates (and their isocyanurates, biurets, uretdiones) and substituted or unsubstituted arylene, aralkylene, and cyclohexylene polyisocyanates. The polyisocyanate usually contains 2 to 40 and preferably 4 to 12 carbon atoms between the NCO groups. The polyisocyanate preferably contains at most four isocyanate groups, more preferably at most three isocyanate groups, and most preferably two isocyanate groups. It is even more preferred to use a symmetrical aliphatic or cyclohexylene diisocyanate. Suitable examples of diisocyanates are preferably selected from the group consisting of tetramethylene-1,4-diisocyanate, hexamethylene-1,6-diisocyanate (HMDI), trans-cyclohexyl-1,4-diisocyanate, dicyclohexylmethane-4,4'-diisocyanate, 1,5-dimethyl-(2,4-ω-diisocyanato methyl)benzene, 1,5-dimethyl(2,4-ω-diisocyanatoethyl)benzene, 1,3,5-trimethyl(2,4-ω-diisocyanatomethyl)benzene, 1,3,5-triethyl(2,4-ω-diisocyanatomethyl) benzene, meta-xylylene diisocyanate, para-xylylene diisocyanate, dicyclohexyl-dimethylmethane-4,4'-diisocyanate, 2,4-toluene diisocyanate, 2,6-toluene diisocyanate, and diphenylmethane-4,4'-diisocyanate (MDI). Further suitable polyisocyanates are preferably selected from the group consisting of polyisocyanates based on HMDI, including condensed derivatives of HMDI, such as uretdiones, biurets, isocyanurates (trimers), and asymmetrical trimers, etc., many of which are marketed as Desmodur® N and Tolonate® HDB and Tolonate® HDT, and polyisocyanates known as "polymeric MDI". Polymeric MDI typically is a mixture of pure MDI and oligomers of MDI. Particularly preferred polyisocyanates are selected from the group consisting of HMDI, its isocyanurate trimer, its biuret, trans-cyclohexyl-1,4-diisocyanate, para- and meta-xylylene diisocyanate, and toluene diisocyanate. Most preferably, HMDI is selected.

As will be understood by the person skilled in the art, it is also possible to use conventionally blocked polyisocyanates which generate two or more isocyanates in situ, as long as the blocking agent, after splitting, does not prevent the formation of the rheology modification agent according to the invention Throughout this document the term "polyisocyanate" is used to denominate all polyisocyanates and polyisocyanate-generating compounds.

As will also be understood by a person skilled in the art, the same urea products can be made in a reverse way, given that amines can be converted to isocyanates, and isocyanates to amines. Products of such "reverse" synthesis procedures although they may be unfavoured in terms of availability of the raw materials are also considered part of the scope of the invention.

In accordance with a preferred embodiment of the invention the first amines, used to prepare the first polyurea product, comprise mono-amines. In a specific preferred embodiment, it is preferable that these amines are chiral. More preferably the mono-amines comprise greater than 20%, more preferably greater than 50%, and most preferably greater than 80%, chiral amines.

It is to be understood that any enantiomer mixture of chiral amines can be used to make a polyurea compound according to the invention. Good results can even be obtained if the chiral amine is a racemic mixture of enantiomers. It is however preferred that in deriving the first polyurea compound (to be used as the template) the chiral amine is provided in a significant enantiomeric excess. The term "enantiomeric excess" is used to indicate the excess of one enantiomer over racemic material in a sample that comprises both enantiomers of the chiral amine. The enantiomeric excess is expressed as a percentage: a racemic sample, i.e. a 50:50 mixture of both enantiomers, has an enantiomeric excess of 0% and an enantiomerically pure sample has an enantiomeric excess of 100%. It is noted that optimum results are usually obtained at higher excess values, but not necessarily at 100%. The enantiomeric excess is preferably at least 25%, more preferably at least 50%, and most preferably at least 75%.

Preferably the first polyurea product is obtainable by reacting one or more first polyisocyanates with chiral amines of the general formula (I) below:

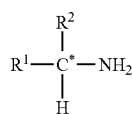

(I)

wherein each of $R^1$ and $R^2$ are independently selected from the group consisting of linear, cyclic or branched, substituted or unsubstituted, saturated or unsaturated hydrocarbyl or a heteroatom containing group, and wherein $R^1$ and $R^2$ of each chiral amine are different such that the carbon atom in the amine is a chiral center. More preferably the substituents $R^1$ and $R^2$ are independently selected from the group consisting of (optionally hetero-atom containing) $C_1$-$C_{25}$ alkyl, aryl, aralkyl and alkenyl groups. Most preferably, $R^2$ is a methyl group. In the case where either of the substituents comprise a hetero-atom group, the substituent is preferably in the form of an ether unit.

It is possible that the substituents $R^1$ and $R^2$ can be taken together with the chiral carbon C* to which they are attached and form a substituted or unsubstituted ring containing 4 to 8 carbon atoms, provided that said ring is such that chirality is maintained at the carbon atom C*.

In a preferred embodiment of the invention, the chiral amine used in the derivation of the first polyurea compound comprises alpha-methylbenzylamine (AMBA) or amino acids and derivatives, in particular, esters thereof. Suitable active amino acid derivatives for use in this regard—preferably in their naturally occurring configuration—may be selected from the group consisting of: alanine (Ala), amino butyric acid (Abu), arginine (Arg), asparagines (Asn), aspartic acid (Asp), cysteine (Cys), glutamic acid (Glu), glutamine (Gin), histidine (H is), homocysteine (Hcy), isoleucine (Ile), leucine (Leu), lysine (Lys), methionine (Met), norleucine (Nle) norvaline (Nva), ornithine (Orn), phenylalanine (Phe), serine (Ser), threonine (Thr), tryptophan (Trp), tyrosine (Tyr), valine (Val), ester derivatives and salts thereof.

In accordance with a preferred embodiment of the invention amines used to derive the second polyurea compound have the general formula (II):

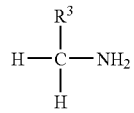

(II)

wherein $R^3$ is selected from the group consisting of linear or branched, substituted or unsubstituted, saturated or unsaturated hydrocarbyl or a heteroatom containing group. Preferably the second amines are selected from the group consisting of substituted and unsubstituted benzyl amines, n-alkylamines, and alkylamines with aromatic substituent groups. More preferably the second amine comprises benzyl amine (BA), hexylamine, 2-phenethylamine and aminomethylpyridine (AMP).

In determining the distinction between the morphologies of the first and second polyurea compounds in that embodiment where the first amine comprises a chiral amine it has been found that optimum results can be obtained if the substituent $R^1$ of amine I is substantially isomorphous with $R^3$ of amine II. As used herein, substantially isomorphous is meant that the size of the substituents $R^1$ and $R^3$ are substantially the same.

In the generation of the first and second polyurea compounds, the ratio of the number of amino groups of the amino compounds to the number of (generated) isocyanate groups may be in the range of 0.7 to 1.5. Preferably, the ratio is about 0.9 to 1.1.

The reaction between each isocyanate and each amine components can be carried out in any arbitrarily chosen way by combining the reaction components, optionally at elevated temperature, as will be clear to a person skilled in the art. It is preferred that the reaction is carried out at temperatures in the range of 0° C. to 150° C., more particularly in the range of 20° C. to 80° C. Although in general the reaction components are combined in any arbitrarily chosen manner, preferably each isocyanate is added to each amine component, which may be done in several steps, if desired. Optionally, the reaction may be carried out in the presence of an inert solvent, for example acetone, methyl isobutyl ketone, N-methylpyrrolidone, benzene, toluene, xylene, or an aliphatic hydrocarbon such as petroleum ether, alcohols, and water, or mixtures thereof, or in the presence of a binder for the final coatings formulation or any other coating formulation component. Here the term "inert" indicates that the solvent does not significantly interfere in the process of polyurea formation, which means that the amount of polyurea formed when solvent is present is at least 80% of the amount produced when no solvent is present. It is also possible that small amounts of co-reactive components are intentionally employed in this reaction to act as crystallisation modifiers, and more particularly to modify the crystal sizes upon precipitation or the colloidal stability of the resulting crystals.

The templated compound is formed by the sequential precipitation of the second polyurea compound in the presence of the first polyurea colloid. The skilled person in the art would be aware of a number of permutations of in-situ and ex-situ reactions by which this could be achieved. Without being limited hereto, a first methodology is that the first polyurea compounds may be formed by reaction of the components in situ, preferably in the presence of a polymeric binder environment, and precipitated in a first reaction vessel to which the second amine amine and isocyanate are then added, reacted and the product thereof precipitated. In such an embodiment, it is imperative that the first precipitate is not permitted to settle in the reaction vessel; many fine, first polyurea compounds in accordance with this invention would not actually settle but where necessary they may be maintained in a dispersed state by means such as stirring or agitation. In an alternative methodology, solutions of the first polyurea compound may be prepared independently and admixed to the resin environment to precipitate and form the seedling colloid from step 1. The second polyurea compound can also be prepared independently and admixed as a solution in a suitable solvent to precipitate in the presence of the colloid of step 1, irrespective of the route used to prepare said first polyurea compound.

It is possible that the second polyureas may be allowed to crystallise after a significant change in environment and conditions from those employed for the crystallisation of the first polyurea compound, for example by the addition of extra components (such as resins and cosolvents) or changing the temperature or viscosity.

The preparation of each of the first and second polyurea compounds may optionally also be carried out in the presence of a binder and certainly it is preferred that the first polyurea compound is prepared as a colloid in the host resin environment. This can be done by mixing a mixture of the binder and the isocyanate with the amine components or by mixing the isocyanates with a mixture of the binder and the amine components, or by mixing two mixtures of binder with amine components and NCO-components, respectively. It will be obvious that if the binder is highly reactive with either the amines or the isocyanate, the binder and that particular susceptible compound cannot be premixed. By the term "highly reactive" is meant here that more than 30% of the susceptible amine or isocyanate reacts with the binder before the amino acid derivative and the isocyanate are mixed in order to prepare the rheology modification agent. The mixing operation may be carried out in any convenient manner, with the reactants being vigorously stirred, in a batch or in a continuous process. Amine components may be added to isocyanate or isocyanate may be added to amine components, whichever is most convenient. If a binder is used and either the amine components or the isocyanate is highly reactive with the binder, then the compound that is most reactive with the binder is preferably added to the mixture of the binder with the compound that is least reactive with the binder.

In one preferred embodiment of the invention, the templated polyurea compounds are produced in the binder or curing component of the final coating composition in such a low concentration that the binder dispersion can still be handled as a fluid and can be subsequently used in the coating composition, optionally using further binder, curing component and/or other (conventional) additives. When the rheology modification agent is produced in the binder, it is preferably prepared at a temperature in the range of 20-80° C., under adequate stirring.

The process for introducing the templated urea components into a host resin environment can be continuous or discontinuous.

The invention further relates to the use of the templated polyurea compound as described above as a rheology modification agent, in particular in coatings, adhesives, printing inks, detergents, paper, paperboard, textiles, construction materials, engineering plastics, pigments, mining fluids, or cosmetics. The most important use of the polyurea compound is as a sag control agent in a coating composition.

The invention further also relates to a coating composition comprising a binder and, as a sag control agent, a polyurea compound or a sag control agent composition according to the invention. The coating composition preferably comprises between 0.05 and 4 wt. percent (%) of the polyurea compound (based on the total solids weight of the coating composition) and more preferably between 0.05 and 2 wt. %. The invention also relates to a coating prepared from a coating composition according to the invention. These coatings have a better combination of sagging resistance and optical appearance.

The coating composition is prepared by mixing the templated polyurea compound, the binder and optional other coating composition components. Preferably a master batch of a sag control agent composition comprising the templated polyurea compound dispersed in a binder material is employed to which further components can be added. Such a masterbatch may comprise the binder, a solvent and 0.1 to 10 wt. %, preferably 0.2 to 7 wt. % and most preferably between 0.5 to 5 wt. % (relative to the total solid weight of the composition) of the polyurea compound, which is dispersed in the binder. The binder content preferably is between 50 and 80 wt. % (relative to the total weight of the composition) and may contain other adjuvants such as dispersants. This master batch SCA composition can be handled as a fluid and can easily be mixed with a coating composition.

Although it is envisaged that the templated polyurea compound can also be added to a coating composition in various different ways, the binder may be mixed with such amounts of the isocyanate and the amine reactants such that, on conclusion of the sequential reaction stages, a mixture is obtained as a solid-like material, which can be used as the aforementioned master batch. The binder may be added at the stage of the reaction yielding the first polyurea compound. Alternatively it may be added before, during or after the stages of reaction that yield the second polyurea compound and precipitate this compound on the first polyurea compound. The resultant mixture may consist of between 5 and 99, preferably between 6 and 50, and more preferably between 7 and 25, parts by weight of the rheology modification agent relative to between 95 and 1, preferably between 94 and 50, more preferably between 93 and 75 parts by weight of the binder. Optionally, further diluents or adjuvants may be added to the mixture to derive the master batch.

The binder that can be thixotropized according to the invention may as a rule be any arbitrarily chosen binder. However suitable examples include polyesters, polyurethanes, alkyd resins, acrylic resins, epoxy resins, unsaturated polyester resins which may optionally be mixed with styrene and/or one or more other monomeric compounds, for instance, a (meth)acrylate monomer or an allyl compound. Functional groups on the binders may comprise hydroxyl groups, acid groups, carbamate groups, epoxy groups, (meth) acryloyl groups, reactive ether groups, (blocked) isocyanate groups, keto groups, amine groups, hydrazide groups, allyl groups and other unsaturated groups. The aforementioned binders may be solvent or water-borne as solutions or as dispersions in these solvents, or alternatively may be supplied without any solvent. The binders in the final coating composition and in the master batch of the rheology modification agents may be of the same or different composition.

Although it is less desired, binder or curing compositions comprising the rheology modification agent may also be prepared or modified in the presence of said rheology modification agent or by preparing the binder or curing compound as well as the rheology modification agent at the same time. The skilled person will have no problem combining the rheology modification agent, or the starting materials for a rheology modification agent, with the starting materials for the binder or curing compound, with subsequent reaction to form the rheology modification agent-containing binder or curing compositions.

The invention further relates to coating compositions comprising a binder and the rheology modification agent according to the invention. When the rheology modification agent is used to formulate coating compositions, the resulting coating compositions show an improved rheology, here dubbed thixotropic, and may have an opaque, opalescent or even transparent appearance, depending on the size and the refractive index of the dispersed particles of the rheology modification agent.

Optionally, conventional additives may be present in any of the coating compositions of the present invention, such as other cobinders, crosslinking agents, solvent and/or dispersing additives, pigment dispersants, dyes, pigments, nanoparticles, UV curing additives, flow additives, other rheology control additives, solvents, and accelerators for the curing reaction, for instance acidic compounds such as p-toluene sulphonic acid or blocked products thereof. The coating compositions may comprise other conventional rheology modification agents which may be solvent based or solventless. In another embodiment, the other conventional rheology modification agents are water based liquids.

The thixotropic coating compositions may be applied to a substrate in any desired manner, for instance by rolling, pneumatic or electrostatic spraying, brushing, sprinkling, casting, and dipping.

The degree to which the rheology is changed, depends, inter alia, on the proportion and the nature of the templated polyurea compound and the components of the composition. As a rule, the desired degree of thixotropy may be obtained by employing the rheology modification agent preferably in an amount of at least 0.01%, more preferably at least 0.05%, even more preferably at least 0.10%, and most preferably at least 0.15%, and preferably of at most 30%, more preferably at most 10%, even more preferably at most 3%, and most preferably at most 1.5%, based on the total weight of the composition.

The thixotropic compositions according to the invention may contain polar and/or non-polar solvents. Preferably, the thixotropy is present not only at room temperature but also at elevated temperature before it collapses, so that the rheology modification agent according to the invention is suitable for use at room temperature and in baking paints (curing), for instance in the range of 25° C. to 250° C., preferably less than 165° C. for between 2 and 120 minutes.

The rheology modification agents can be used in all kinds of thermoplastic and crosslinking coatings formulations; they are preferably used in coating compositions based on polyolisocyanate curing (including all blocked isocyanates, and compounds as Cylink 2000® Cytec) in which OH functions can be exchanged at carbamate groups), polyol-curing with formaldehyde based crosslinkers (e.g. the melamine formaldehyde types commonly used), polycarbamates with formaldehyde based crosslinkers, sterically hindered amines (e.g. Desmophen® NH 1220, Desmophen® NH 1420, and Desmophen® NH 1521) with isocyanates, thiols with isocyanates, (meth)acryloyl based coating compositions, epoxy curable coating compositions (using acids, anhydrides or amines as crosslinker), and any systems combining more than one of these chemistries, the latter also referred to as hybrid curable coating compositions (e.g. acryloyl based systems integrated in an OH—NCO curing system). Other crosslinking chemistries that may be used in combination with the rheology control agents of the invention, are based on keto-functional binders, or acetoacetoxy functional binders, or binders than can cure through an oxidative mechanism (e.g. using unsaturated polyesters), or by a radical mechanism triggered by a thermal radical initiator, a photoinitiating system, or high energy radiation.

In accordance with a preferred embodiment of the invention, a process for curing a coating composition comprising the templated polyurea compound (thixotropic agent), a binder and/or a solvent comprises heating said composition to a curing temperature ($T_{curing}$) selected such that the curing temperature is greater than the dissolution temperature of the first polyurea reaction product ($T_{curing} > T_{m1}$) comprised within said thixotropic agent, but less than the dissolution temperature of the second polyurea reaction product ($T_{curing} < T_{m2}$) comprised within said thixotropic agent.

Next to coating applications, other applications in which the rheology control agents of the invention may be used in, are adhesives, printing inks, e.g. in screen printing applications or anti-misting applications, detergents and cleaning applications, paper and paperboard industries, textile, leather, and carpet applications, construction compounds, pigment compositions, mining and cosmetics.

EXAMPLES

Examples of the products of the invention and comparative examples will now be described by way of illustration only, and not to limit the invention. The Examples shall be described with reference to the accompanying figures in which.

Figure 8:
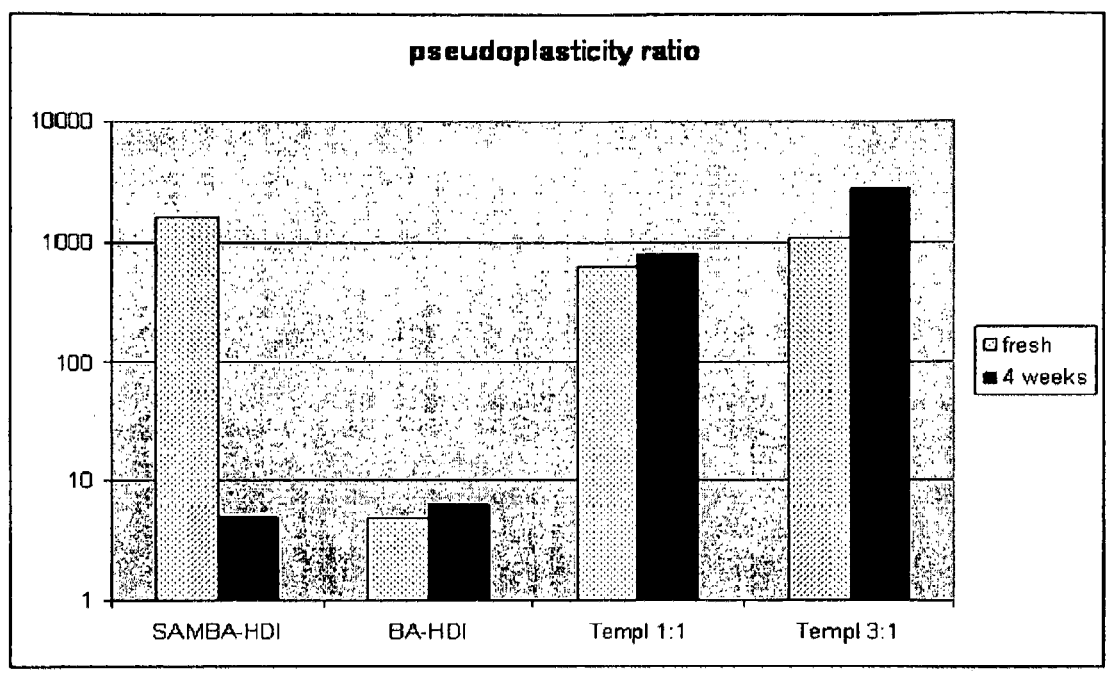

FIG. 8 compares the pseudoplasticity of three formulations, when both fresh and aged for a given time period, wherein two of the formulations comprise polyurea products prepared in accordance with the present invention and the third is prepared with a polyurea compound known in the prior art.

The compounds referred to in the Example and Comparative Examples are recognised, industrially available compounds commonly used in the manufacture of polyurea compounds:

Setalux™, Setal™ and Setamine™ formulations are all available from Nuplex Resins and wherein: i) Setal™ 166 SS-80 comprises an 80% polyester polyol in buytlacetate/o-xylene; ii) Setalux™ 1715 VX-7 comprises a 74% saturated polyester resin in Solvesso 100%-xylene; iii) Setalux™ 1767 VV-65 comprises a 67% acrylic polyol in Solvesso 100; iv) Setalux™ 1757 VX-70 comprises a 70% thermosetting hydroxylated acrylic copolymer in Solvesso 100; v) Setalux™ 1760 VB-64 comprises a 64% thermosetting hydroxylated acrylic copolymer in Solvesso 100/n-butanol; yl) Setalux™ 8503 SS-60 comprises a 60% epoxy functional acrylic resin in butylacetate; vii) Setamine™ US138 comprises a butylated melamine formaldehyde resin.

Solvesso™ formulations are aromatic hydrocarbons available from ExxonMobil Chemicals;

Cymel™ 303 is a methylated melamine resin available from Cytec Industries;

Nacure™ 5225 is a solution of dodecybenzenesulphonic acid (DDBSA) in Isopropanal (IPA) available from King Industries U.S.A.; and Tolonate™ is an isocyanate crosslinker available from Rhodia PPMC. (The registration of the above trademarks is acknowledged such that the superscript TM will be omitted hereinafter).

Furthermore, herein the following common abbreviations will be utilised:

| HDI: | Hexamethylene diisocyanate |
| AMBA: | Alpha (α-) methylbenzylamine |
| BA: | Benzylamine |
| L-alabu: | L-alanine butylester |

The prefixes R-, S-(employed herein for amines) and L-(employed herein for amino acids) are used in accordance with their normal meaning in the nomenclature of stereogenic centres.

Preparation of the Formulations:

In the example and comparative examples described below, various sag control agents for coating compositions were prepared by reacting polyisocyanates and mono amines in the presence of a polyol binder (hereinafter referred to as the polyol SCA mixture).

One component (1K) polyol formulations were prepared by blending the relevant polyol SCA mixture with the an amount of unmodified polyol of the same nature, and an amount of Setamine US138, in a ratio of 70/30 by dry weight (polyol/melamine crosslinker), and diluted further with Solvesso 100 to a formulation with a high shear viscosity of 700 mPas; this is a viscosity level assumed to be typical of a paint being sprayed and arriving at the substrate. The amount of SCA reported is based on the amount of amine and isocyanate used, relative to total dry weight.

Polyol 2K formulations were prepared by blending the relevant polyol SCA mixture with an amount of unmodified polyol of the same nature, an amount of Tolonate HDT isocyanate crosslinker, in a ratio to obtain a OH—NCO stoichiometry of approximately 1. This mixture was diluted further with butylacetate to obtain a high shear viscosity of 700 mPas. The amount of SCA reported is that based on total dry weight.

The epoxy acid formulation was prepared by blending a relevant amount of epoxy-functional resin with SCA modification, with an amount of the same unmodified epoxy-functional resin, and a triacid solution prepared according to preparation C of European Patent Application No. EP-A-0275138 (the disclosure of which is incorporated herein) in order to obtain a 1:1 stoichiometry of acid and epoxy groups. This formulation was diluted further with butylacetate to obtain a high shear viscosity of 700 mPas.

Compliance measurements were performed at room temperature in a stress-controlled Rheometer, after short high shear treatment to break all rheological structure present, at a constant shear stress of 0.5 Pa, simulating gravitational effects on a vertical wet film of typical thickness. The compliance is considered proportional to the cumulative amount of flow exhibited by the wet film at room temperature.

For all of the examples hereinafter (as distinct from those comparative examples only consisting of second step polyurea compounds) coating formulations obtained, as well as the resuting coatings, were optically transparent and haze free, this aspect illustrating an important advantage of the materials prepared according to the invention.

Example 1

(90/10) S/R-AMBA+HDI/BA+HDI in Setal 166 SS-80 (1:1)

100.0 g of Setal 166 SS-80 was added in a reactor, and mixed with 0.06 g (0.5 mmoles) of R-(+)-α-methylbenzylamine and 0.58 g (4.8 mmoles) S-(−)-α-methylbenzylamine, using a rotating disk dissolver at 1500 rpm for 2 minutes. The stirring speed was raised to 4000 rpm, and 0.46 g (2.7 mmoles) of 1,6-hexamethylenediisocyanate was added using a syringe. The mixture was stirred for an additional 30 seconds at 4000 rpm. The stirring speed was reduced to 1000 rpm and after 2 minutes 0.60 g (5.6 mmoles) benzylamine was added. A mixture of 0.49 g (2.91 mmoles) 1,6-hexamethylenediisocyanate and 0.49 g butylacetate was added to the reactor in 15 minutes using a pump. The mixture was stirred for an additional 30 seconds at 1000 rpm.

Example 1A (90/10) S/R-AMBA+HDI/BA+HDI in Setal 166 SS-80 (1:1)

100.0 g of Setal 166 SS-80 was added in a reactor, and mixed with 0.06 g (0.50 mmoles) of R-(+)-α-methylbenzylamine and 0.58 g (4.8 mmoles) S-(−)-α-methylbenzylamine, using a rotating disk dissolver at 1500 rpm for 2 minutes. The stirring speed was raised to 4000 rpm, and 0.46 g (2.7 mmoles) of 1,6-hexamethylenediisocyanate was added using a syringe. The mixture was stirred for an additional 30 seconds at 4000 rpm. The stirring speed was reduced to 1000 rpm and after 5 minutes 0.60 g (5.6 mmoles) benzylamine was added. The mixture was stirred for an additional 2 minutes at 1000 rpm. The stirring speed was raised to 1500 rpm and 0.50 g (2.97 mmoles) 1,6-hexamethylenediisocyanate was added using a syringe. The mixture was stirred for an additional 30 seconds at 1000 rpm.

Comparative Example 1

BA+HDI in Setal 166 SS-80

100.0 g of Setal 166 SS-80 was added in a reactor, and mixed with 1.22 g (11.4 mmoles) of benzylamine, using a rotating disk dissolver at 1500 rpm for 5 minutes. The stirring speed was raised to 4000 rpm, and 0.99 g (5.9 mmoles) of 1,6-hexamethylenediisocyanate was added using a syringe. The mixture was stirred for an additional 30 seconds at 4000 rpm and was turbid in nature.

Comparative Example 2

(90/10) S/R-AMBA+HDI in Setal 166 SS-80

100.0 g of Setal 166 SS-80 was added in a reactor, and mixed with 0.14 g (1.15 mmoles) of R-(+)-α-methylbenzylamine and 1.16 g (9.6 mmoles) of S-(−)-alpha-methylbenzylamine, using a rotating disk dissolver at 1500 rpm for 5 minutes. The stirring speed was raised to 4000 rpm, and 0.93 g (5.5 mmoles) of 1,6-hexamethylenediisocyanate was added using a syringe. The mixture was stirred for an additional 30 seconds at 4000 rpm.

Figure 1:
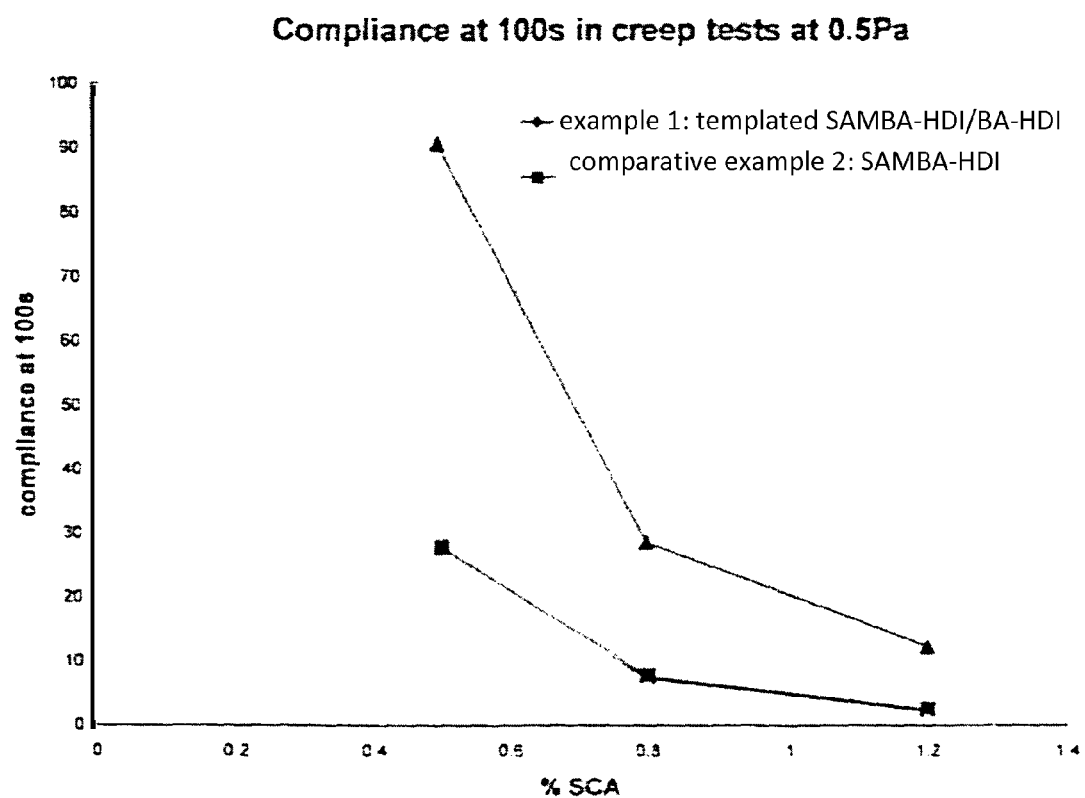
FIG. 1 illustrates the comparative compliance (after 100 s at 0.5 Pa) of a templated polyurea product in accordance with this invention and both a single polyurea compound and a blend of two such compounds.

Formulations (2K) were made of the materials of Example 1 and Comparative Examples 1 and 2 based on Setal 166 and Tolonate HDT (isocyanate crosslinker), as described above. The compliances measured for the various examples in formulations having varying levels of SCA are shown in FIG. 1. Formulations derived from Comparative Example 1 are not included in FIG. 1 because they were found to considerably less rheologically active; even at a level of 1.2% SCA, a compliance of >90 $Pa^{-1}$ is found. The most important feature of FIG. 1 is that the compliance values of the Example 1 based formulation, and employing the templated SCA, are even lower than that of the pure SAMBA-HDI at all tested levels of SCA.

Figure 2:
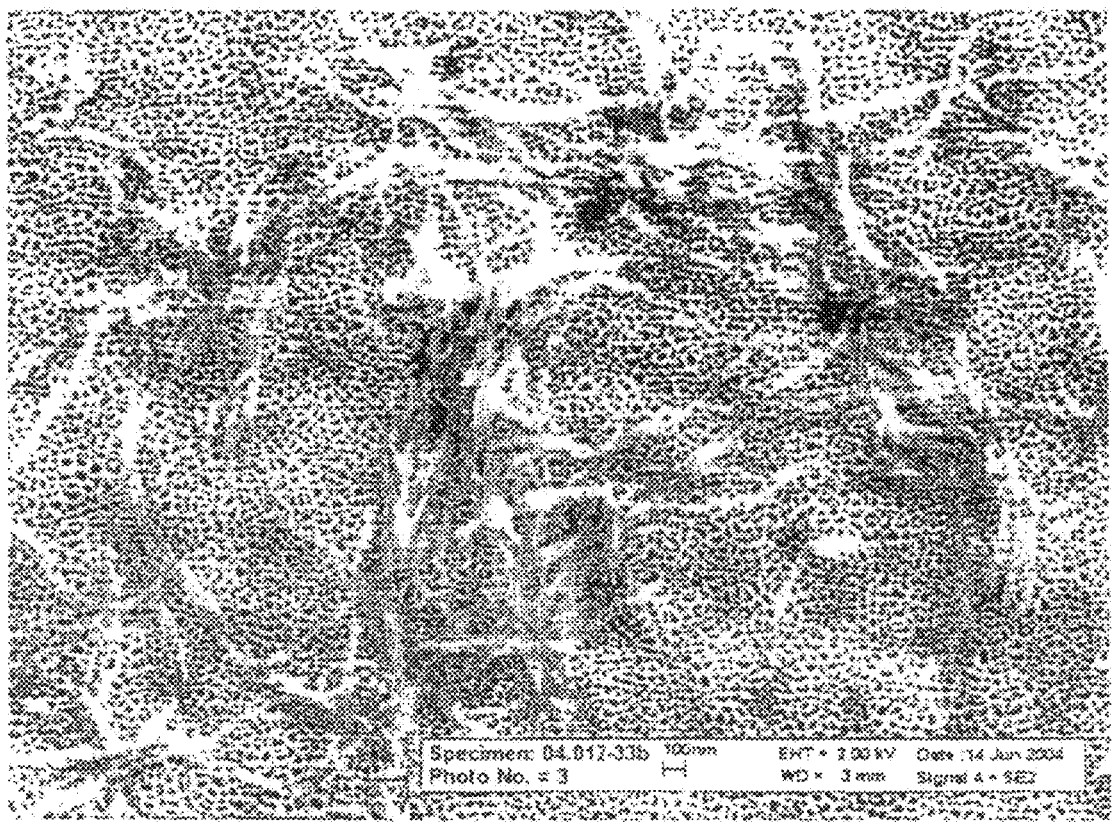
FIG. 2 is a Scanning Electron Micrograph of a templated polyurea compound in accordance with this invention. The image was recorded at a magnification of 4000.

The morphology of the "templated" SCA as described in example 1 is illustrated in FIG. 2. It can be seen that it corresponds closely in shape and fineness to that of the SAMBA-HDI (FIG. 3), and not to that of the BA-HDI (FIG. 4) although that last compound constitutes half of the urea material. Apparently, we have succeeded in growing BA-HDI onto the preformed SAMBA-HDI, thus transferring the favorable morphology of the latter onto the BA-HDI.

Figure 3:
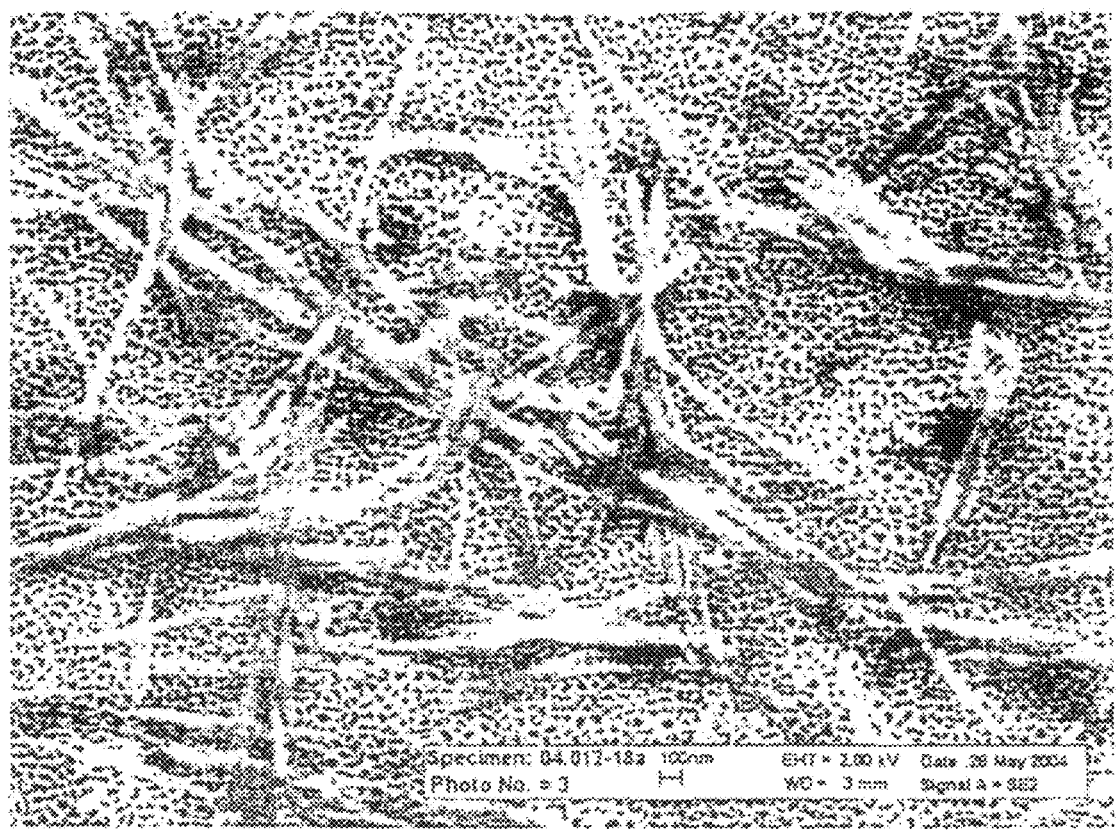
FIG. 3 is a Scanning Electron Micrograph of a first polyurea compound prepared in accordance with the prior art. The image was recorded at a magnification of 4000.
Figure 4:
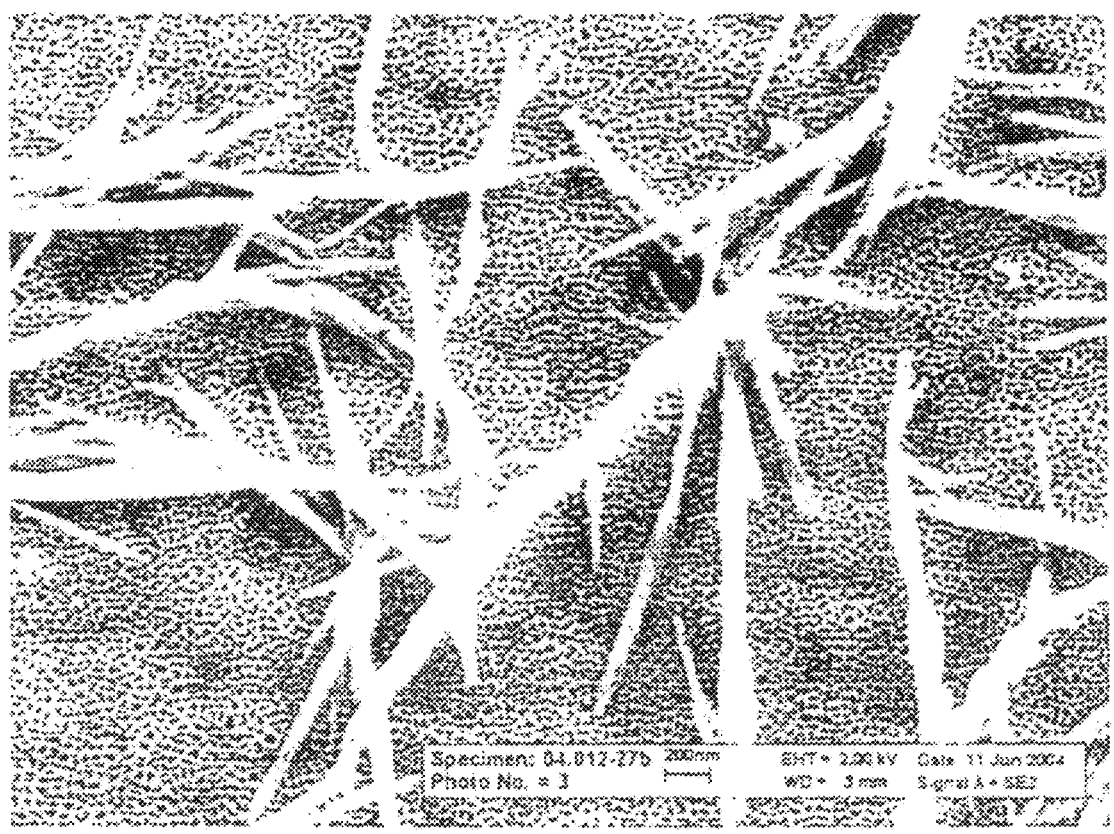
FIG. 4 is a Scanning Electron Micrograph of a second polyurea compound prepared in accordance with the prior art. The image was recorded at a magnification of xxxx (and as such the reader is requested to note the difference in scale of the structures shown therein).

This morphology illustrated in FIGS. 2 to 4 impacts on the transparency of the SCA containing samples. Whereas the BA-HDI formulation has a turbid character at room temperature, the templated material has a much higher transparency, similar to the SAMBA-HDI comparative example. This transparency can be a strong advantage if the formulations are cured under conditions where not all SCA particles dissapear by dissolution or reaction.

Figure 5:
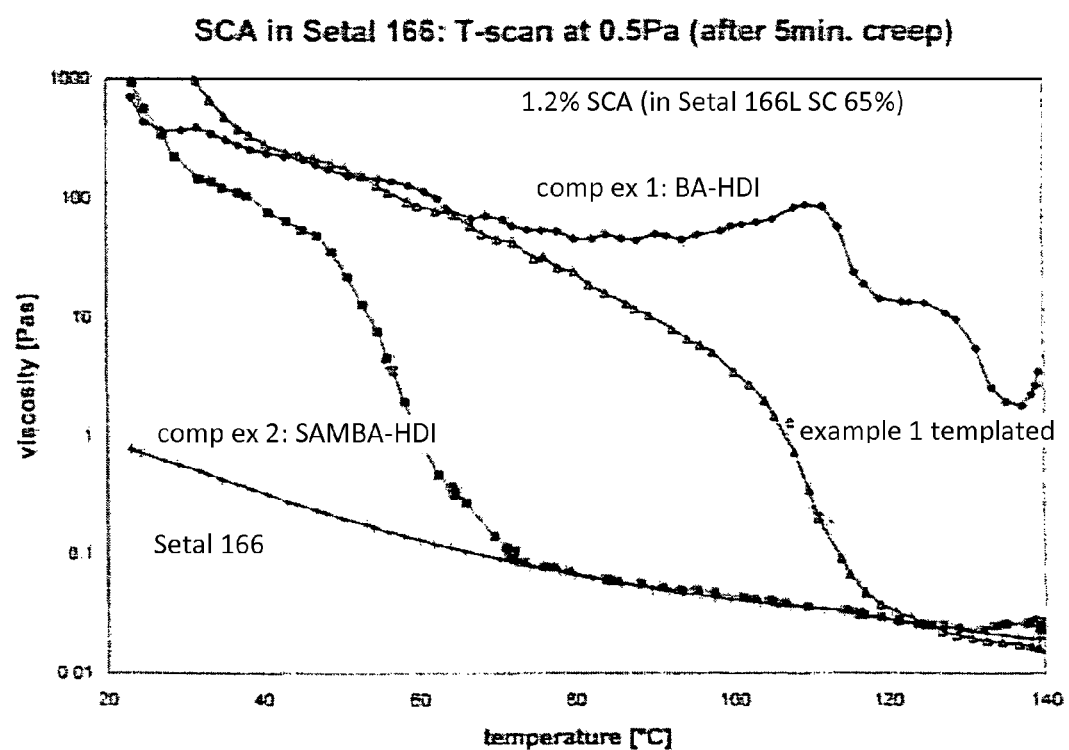
FIG. 5 is a graph illustrating and the effect of temperature on the viscosity of a templated polyurea product in accordance with the present invention and comparing this to corresponding effects on non-templated and blended polyurea compounds.

A further effect of the two-stage SCA from Example 1 is illustrated in FIG. 5, in which the viscosities of formulations derived from Example 1 and comparatives examples 1 to 3 (in the abssence of crosslinker) are measured as a function of temperature in a rheometer, after a structure build-up was allowed during 5 minutes under 0.5 Pa shear stress at room temperature, to mimic the effect in a curing oven. FIG. 5 illustrates that whereas Comparative Example 1 maintains its structure up to high temperature, the Comparative Example 2 loses its effectiveness at an earlier stage during the heating cycle, presumably due to its lower melting point. The temperature behavior of the templated SAMBA-HDI/BA-HDI is different in that its structure is substantially maintained up to an intermediate temperature. This effect indicates that it is possible to tune the temperature of the effective structural collapse of the rheological structure of the templated polyurea SCA.

Example 2

(90/10) S/R-AMBA+HDI/BA+HDI in Setal 166 SS-80 (1:1)

100.0 g of Setal 166 SS-80 was added in a reactor, and mixed with 0.06 g (0.5 mmoles) of R-(+)-αmethylbenzylamine and 0.58 g (4.8 mmoles) S-(−)-α-methylbenzylamine, using a rotating disk dissolver at 1500 rpm for 2 minutes. The stirring speed was raised to 4000 rpm, and 0.46 g (2.7 mmoles) of 1,6-hexamethylenediisocyanate was added using a syringe. The mixture was stirred for an additional 30 seconds at 4000 rpm. The stirring speed was reduced to 1000 rpm and after 2 minutes 0.60 g (5.6 mmoles) benzylamine was added. A mixture of 0.49 g (2.9 mmoles) 1,6-hexamethylenediisocyanate and 0.49 g butylacetate was added to the reactor in 15 minutes using a pump. The mixture was stirred for an additional 30 seconds at 1000 rpm.

Example 3

(90/10) S/R-AMBA+HDI/BA+HDI in Setal 166 SS-80 (1:2)

100.0 g of Setal 166 SS-80 was added in a reactor, and mixed with 0.04 g (0.33 mmoles) of R-(+)-αmethylbenzylamine and 0.38 g (3.1 mmoles) S-(−)-α-methylbenzylamine, using a rotating disk dissolver at 1500 rpm for 2 minutes. The stirring speed was raised to 4000 rpm, and 0.30 g (1.8 mmoles) of 1,6-hexamethylenediisocyanate was added using a syringe. The mixture was stirred for an additional 30 seconds at 4000 rpm. The stirring speed was reduced to 1000 rpm and after 2 minutes 0.81 g (7.6 mmoles) benzylamine was added. A mixture of 0.65 g (3.9 mmoles) 1,6-hexamethylenediisocyanate and 0.65 g butylacetate was added to the reactor in 15 minutes using a pump. The mixture was stirred for an additional 30 seconds at 1000 rpm.

Example 4

(90/10) S/R-AMBA+HDI/BA+HDI in Setal 166 SS-80 (1:3)

100.0 g of Setal 166 SS-80 was added in a reactor, and mixed with 0.03 g (0.25 mmoles) of R-(+)-α-methylbenzylamine and 0.29 g (2.4 mmoles) S-(−)-α-methylbenzylamine, using a rotating disk dissolver at 1500 rpm for 2 minutes. The stirring speed was raised to 4000 rpm, and 0.23 g (1.4 mmoles) of 1,6-hexamethylenediisocyanate was added using a syringe. The mixture was stirred for an additional 30 seconds at 4000 rpm. The stirring speed was reduced to 1000 rpm and after 2 minutes 0.91 g (8.5 mmoles) benzylamine was added. A mixture of 0.74 g (4.4 mmoles) 1,6-hexamethylenediisocyanate and 0.74 g butylacetate was added to the reactor in 15 minutes using a pump. The mixture was stirred for an additional 30 seconds at 1000 rpm.

The materials from Examples 2 to 4 (which are varied in the relative amount of SAMBA-HDI material used to the BA-HDI material grown onto it) were formulated as 2K polyolisocyanate coatings of which the respective compliances were recorded at 0.5 Pa shear stress. The values are listed in Table 1, and can be compared to those shown in FIG. 1. Example 1a and 2 can be compared since they only differ in the process details of the two stage process; both give very low compliance values.

TABLE 1

| Setal 166 SCA 2K formulation based on: | Compliance after 100 s at 0.5 Pa (1/Pa) | |
| --- | --- | --- |
|  | 1.2% SCA | 0.5% SCA |
| Example 1a - Templated 1:1 | 0.59 | — |
| Example 2 - Templated 1:1 | 1.53 | 23.6 |

TABLE 1-continued

| Setal 166 SCA 2K formulation based on: | Compliance after 100 s at 0.5 Pa (1/Pa) | |
|---|---|---|
| | 1.2% SCA | 0.5% SCA |
| Example 3 - Templated 1:3 | 1.24 | — |
| Example 4 - Templated 1:4 | 1.35 | 24.2 |

It can be seen that the flash-off compliance remains very low, even if the amount of SAMBA-HDI nucleating urea is reduced to 25% of the total SCA.

Example 5

(90/10) S/R-AMBA+HDI/BA+HDI in Setalux 1715 VX-74 (1:1)

125.00 g of Setalux 1715 VX-74 was added in a reactor, and mixed with 0.07 g (0.6 mmoles) of R-(+)-α-methylbenzylamine and 0.67 g (5.5 mmoles) S-(−)-α-methylbenzylamine, using a rotating disk dissolver at 1500 rpm for 2 minutes. The stirring speed was raised to 4000 rpm, and 0.53 g (3.15 mmoles) of 1,6-hexamethylenediisocyanate was added using a syringe. The mixture was stirred for an additional 30 seconds at 4000 rpm. The stirring speed was reduced to 1000 rpm and after 2 minutes 0.70 g (6.5 mmoles) benzylamine was added. A mixture of 0.56 g (3.3 mmoles) 1,6-hexamethylenediisocyanate and 0.56 g butylacetate was added to the reactor in 15 minutes using a pump. The mixture was stirred for an additional 30 seconds at 1000 rpm.

Comparative Example 3

S-AMBA+HDI in Setalux 1715 VX-74

100.0 g of Setalux 1715 VX-74 was added in a reactor, and mixed with 1.19 g (9.82 mmoles) S-(−)-α-methylbenzylamine, using a rotating disk dissolver at 1500 rpm for 2 minutes. The stirring speed was raised to 4000 rpm, and 0.85 g (5.1 mmoles) of 1,6-hexamethylenediisicyanate was added using a syringe. The mixture was stirred for an additional 30 seconds at 4000 rpm.

Comparative example 4

BA+HDI in Setalux 1715 VX-74

100.0 g of Setalux 1715 VX-74 was added in a reactor, and mixed with 1.13 g (10.5 mmoles) benzylamine, using a rotating disk dissolver at 1500 rpm for 2 minutes. The stirring speed was raised to 4000 rpm, and 0.92 g (5.5 mmoles) of 1,6-hexamethylenediisocyanate was added using a syringe. The mixture was stirred for an additional 30 seconds at 4000 rpm and was turbid in nature.

Formulations ("1K") were prepared based on the Setalux 1715 resin example 5, and comparative examples 3 and 3, with Setamine US138 and tested in a compliance experiment. The results are listed in table 2.

TABLE 2

| Setalux 1715 1.2% SCA 1K Formulation based on: | Compliance after 100 s at 0.5 Pa (1/Pa) |
|---|---|
| Example 5 - Templated 1:1 | 1.53 |
| Comparative Example 3 | 15.8 |
| Comparative Example 4 | 36.4 |

It can be seen that also in such a 1K formulation, the templated SCA from example 5 is more effective in reducing flash-off compliance that either component prepared separately.

Example 6

S-AMBA+HDI/BA+HDI in Setalux 1767 VV-65 (1:1)

600 g of Setalux 1767 VV-65 was added in a reactor, and mixed with 4.40 g (36.3 mmoles) S-(−)-α-methylbenzylamine, using a rotating disk dissolver at 1500 rpm for 5 minutes. The temperature was raised to 40° C. in these 5 minutes. The stirring speed was raised to 4000 rpm, and 3.14 g (18.7 mmoles) of 1,6-hexamethylenediisocyanate was added using a syringe. The mixture was stirred for an additional 1 minute and 30 seconds at 4000 rpm. Then the stirring speed was reduced to 1500 rpm and after 5 minutes 4.18 g (39.0 mmoles) benzylamine was added. This was mixed for 2 minutes and 30 seconds at 1500 rpm. A mixture of 3.38 g (20.1 mmoles) 1,6-hexamethylenediisocyanate and 3.4 g Solvesso 100 was added to the reactor in 15 minutes using a pump. The mixture was stirred for an additional 2 minutes at 1000 rpm.

Comparative example 5

3.75% S-AMBA+HDI in Setalux 1767 VV-65

100.0 g of Setalux 1767 VV-65 was added in a reactor, and mixed with 1.49 g (12.3 mmoles) S-(−)-α-methylbenzylamine, using a rotating disk dissolver at 1500 rpm for 2 minutes. The stirring speed was raised to 4000 rpm, and 1.07 g (6.36 mmoles) of 1,6-hexamethylenediisocyanate was added using a syringe. The mixture was stirred for an additional 30 seconds at 4000 rpm.

Comparative Example 6

3.75% BA+HDI in Setalux 1767 VV-65

100.0 g of Setalux 1767 VV-65 was added in a reactor, and mixed with 1.42 g (11.7 mmoles) benzylamine, using a rotating disk dissolver at 1500 rpm for 2 minutes. The stirring speed was raised to 4000 rpm, and 1.15 g (6.8 mmoles) of 1,6-hexamethylenediisocyanate was added using a syringe. The mixture was stirred for an additional 30 seconds at 4000 rpm and was of a turbid nature.

2K (NCO containing) formulations were prepared based on Setalux 1767, using the examples and comparative examples described above. The results, in terms of flash-off compliance, are listed in table 3, and illustrate the enhanced activity of the templated SCA with respect to both individual components.

TABLE 3

| Setalux 1767 1.2% SCA 1K Formulation based on: | Compliance after 100 s at 0.5 Pa (1/Pa) |
|---|---|
| Example 6 - Templated 1:1 | 8.4 |
| Comparative Example 5 | 26.4 |
| Comparative Example 6 | 140.0 |

Example 7

(90/10) S/R-AMBA+HDI/BA+HDI in Setalux 1757 VV-70 (1:1)

125.0 g of Setalux 1757 VV-70 was added in a reactor, and mixed with 0.07 g (0.58 mmoles) of R-(+)-α-methylbenzylamine and 0.63 g (5.2 mmoles) S-(−)-α-methylbenzylamine, using a rotating disk dissolver at 1500 rpm for 2 minutes. The stirring speed was raised to 4000 rpm, and 0.50 g (3.0 mmoles) of 1,6-hexamethylenediisocyanate was added using a syringe. The mixture was stirred for an additional 30 seconds at 4000 rpm. The stirring speed was reduced to 1000 rpm and after 2 minutes 0.66 g (6.2 mmoles) benzylamine was added. The mixture was stirred for an additional 2 minutes at 1000 rpm. A mixture of 0.53 g (3.15 mmoles) 1,6-hexamethylene-diisocyanate and 0.53 g butylacetate was added to the reactor in 15 minutes using a pump. The mixture was stirred for an additional 60 seconds at 1000 rpm.

Comparative Example 7

S-AMBA+HDI in Setalux 1757 VV-70

100.0 g of Setalux 1757 VV-70 was added in a reactor, and mixed with 1.13 g (9.32 mmoles) S-(−)-α-methylbenzylamine, using a rotating disk dissolver at 1500 rpm for 2 minutes. The stirring speed was raised to 4000 rpm, and 0.82 g (4.88 mmoles) of 1,6-hexamethylenediisocyanate was added using a syringe. The mixture was stirred for an additional 30 seconds at 4000 rpm.

Comparative Example 8

2.66% BA+HDI in Setalux 1757 VV-70

100.0 g of Setalux 1757 VV-70 was added in a reactor, and mixed with 1.06 g (9.9 mmoles) benzylamine, using a rotating disk dissolver at 1500 rpm for 2 minutes. The stirring speed was raised to 4000 rpm, and 0.87 g (5.2 mmoles) of 1,6-hexamethylenediisocyanate was added using a syringe. The mixture was stirred for an additional 30 seconds at 4000 rpm and was of a turbid nature.

1K (Setamine US 138 melamine formaldehyde crosslinker containing) formulations were prepared based on Setalux 1757, using the examples and comparative examples described above. The results, in terms of flash-off compliance, are listed in Table 4 which illustrates the enhanced activity of the templated SCA when compared to both individual components.

TABLE 4

| Setalux 1757 1.2% SCA 1K Formulation based on: | Compliance after 100 s at 0.5 Pa (1/Pa) |
|---|---|
| Example 7 - Templated 1:1 | 4.1 |
| Comparative Example 7 | 16.0 |
| Comparative Example 8 | 48.0 |

Figure 6:
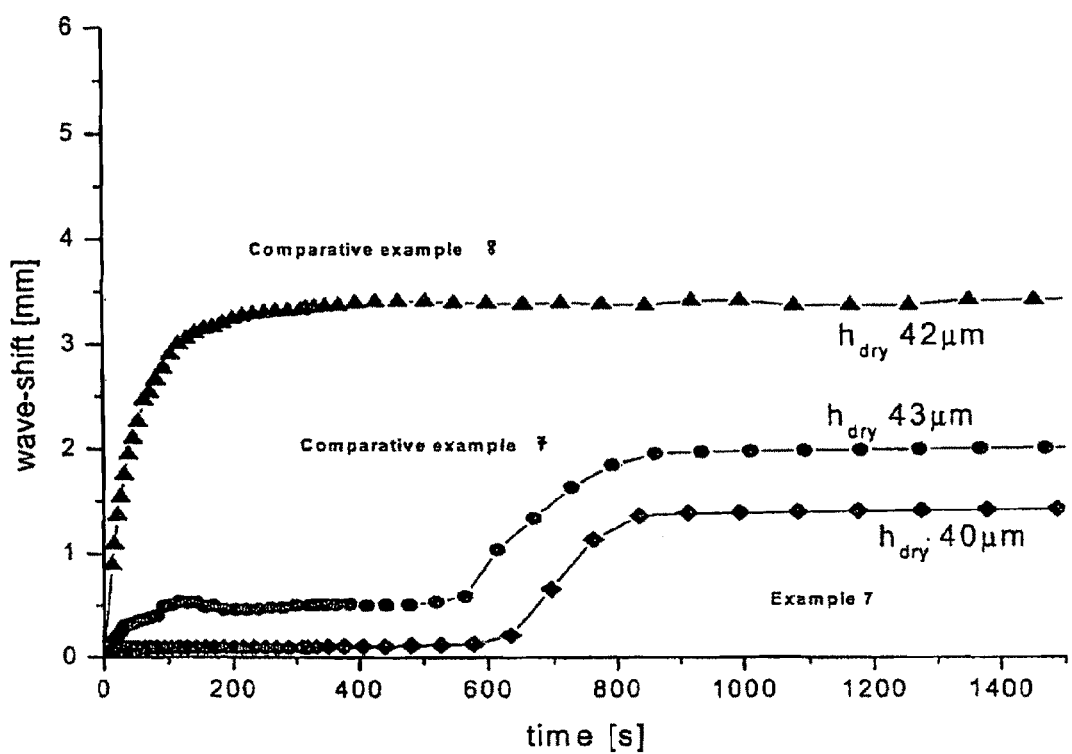
FIG. 6 illustrates the results of a so-called 'wave-test' in which the displacements of the original surface profiles of one coating prepared in accordance with this invention and two prior art coatings are followed as a function of time.

The same formulations were also tested using the so-called falling-wave set-up. In this experiment, the displacement of an original surface profile due to gravitation pull can be followed as a function of time. These experiments include the effect of evaporation, as well as mimic a realistic flash-off time at room temperature, followed by a heating cycle. The wave displacement can be determined both in the flash-off period (5 minutes), as well as that during heating (up to 140° C., at an initial rate of 30° C./min). The results are shown in FIG. 6: this indicates that the templated combination material exhibits low fluidity during flash-off and that its flow starts in the oven somewhat later than that of the SAMBA-HDI; however, its cumulative amount of oven flow is intermediate between that of the two comparative examples. It is possible to control the amount of flow in the last stages of the curing process by the materials according to the invention, and the ratio of the two materials used. This control of the flow in the last stages of the curing process is believed to be helpful in obtaining the best appearance possible.

Example 8

3.75% S-AMBA+HDI/AMP+HDI in Setalux 1760 VB-64 (1:1)

100.0 g of Setalux 1760 VB-64 was added in a reactor, and mixed with 0.72 g (5.9 mmoles) S-(−)-α-methylbenzylamine, using a rotating disk dissolver at 1500 rpm for 2 minutes. The stirring speed was raised to 4000 rpm, and 0.52 g (3.1 mmoles) of 1,6-hexamethylenediisocyanate was added using a syringe. The mixture was stirred for an additional 30 seconds at 4000 rpm. The stirring speed was reduced to 1000 rpm and after 2 minutes 0.69 g (6.4 mmoles) 3-(aminomethyl)pyridine (AMP) was added. A mixture of 0.55 g (3.3 mmoles) 1,6-hexamethylenediisocyanate and 1.65 g Solvesso 100 was added to the reactor in 15 minutes using a pump. The mixture was stirred for an additional 30 seconds at 1000 rpm.

Comparative example 9

3.75% AMP+HDI in Setalux 1760 VB-64

100.0 g of Setalux 1760 VB-64 was added in a reactor, and mixed with 1.40 g (13.0 mmoles) 3-(aminomethyl)pyridine (AMP), using a rotating disk dissolver at 1500 rpm for 2 minutes. The stirring speed was raised to 4000 rpm, and 1.12 g (6.7 mmoles) of 1,6-hexamethylene-diisocyanate was added using a syringe. The mixture was stirred for an additional 30 seconds at 4000 rpm and was turbid in nature.

Comparative Example 10

3.75% S-AMBA+HDI in Setalux 1760 VB-64

100.0 g of Setalux 1760 VB-64 was added in a reactor, and mixed with 1.47 g (12.1 mmoles) S-(−)-α-methylbenzylamine, using a rotating disk dissolver at 1500 rpm for 2 minutes. The stirring speed was raised to 4000 rpm, and 1.05 g (6.2 mmoles) of 1,6-hexamethylenediisocyanate was added using a syringe. The mixture was stirred for an additional 30 seconds at 4000 rpm.

1K formulations based on Setalux 1760 were prepared of the materials prepared above, and compared in terms of compliance. The results are given in Table 5, form which it can be deduced that the templated combination SCA is much more effective in terms of compliance compared to either individual component.

TABLE 5

| Setalux 1760 1.2% SCA 1K Formulation based on: | Compliance after 100 s at 0.5 Pa (1/Pa) |
|---|---|
| Example 8 - Templated 1:1 | 2.8 |
| Comparative Example 9 | 93.0 |
| Comparative Example 10 | 27.0 |

Example 9

3.75% L-Alabu+HDI/BA+HDI in Setalux 1760 VB-64 (1:1)

100.0 g of Setalux 1760 VB-64 was added in a reactor, and mixed with 0.77 g (5.3 mmoles) L-alanine butylester, using a rotating disk dissolver at 1500 rpm for 2 minutes. The stirring speed was raised to 4000 rpm, and 0.46 g (2.7 mmoles) of 1,6-hexamethylene-diisocyanate was added using a syringe. The mixture was stirred for an additional 30 seconds at 4000 rpm. The stirring speed was reduced to 1000 rpm and after 2 minutes 0.69 g (6.4 mmoles) benzylamine was added. A mixture of 0.55 g (3.3 mmoles) 1,6-hexamethylenediisocyanate and 1.65 g Solvesso 100 was added to the reactor in 15 minutes using a pump. The mixture was stirred for an additional 30 seconds at 1000 rpm.

Comparative Example 11

3.75% L-alabu+HDI in Setalux 1760 VB-64

100.0 g of Setalux 1760 VB-64 was added in a reactor, and mixed with 1.58 g (10.9 mmoles) L-Alanine butylester, using a rotating disk dissolver at 1500 rpm for 2 minutes. The stirring speed was raised to 4000 rpm, and 0.94 g (5.6 mmoles) of 1,6-hexamethylene-diisocyanate was added using a syringe. The mixture was stirred for an additional 30 seconds at 4000 rpm.

Comparative Example 12

3.75% BA+HDI in Setalux 1760 VB-64

100.0 g of Setalux 1760 VB-64 was added in a reactor, and mixed with 1.40 g (13.1 mmoles) benzylamine, using a rotating disk dissolver at 1500 rpm for 2 minutes. The stirring speed was raised to 4000 rpm, and 1.13 g (6.7 mmoles) of 1,6-hexamethylenediisocyanate was added using a syringe. The mixture was stirred for an additional 30 seconds at 4000 rpm and was turbid in nature.

1K formulations based on Setalux 1760 were prepared of the materials prepared above, and compared in terms of compliance. The results are given in Table 6, form which it can be deduced that the templated combination SCA is effective in providing a low compliance, especially when compared to the BA-HDI comparative example. The compliance is somewhat higher than that of the SAMBA-HDI comparative example, but not by as much as may have been expected based on the fact that only half the amount of that material was used.

TABLE 6

| Setalux 1760 1.2% SCA 1K Formulation based on: | Compliance after 100 s at 0.5 Pa (1/Pa) |
|---|---|
| Example 9 - Templated 1:1 | 27 |
| Comparative Example 11 | 14 |
| Comparative Example 12 | 132 |

Example 10

S-AMBA+HDI/BA+HDI in Setalux 8503 SS-60 (1:1)

650.0 g of Setalux 8503 SS-60 was added in a reactor, and mixed with 4.40 g (36.3 mmoles) S-(−)-α-methylbenzylamine, using a rotating disk dissolver at 1500 rpm for 5 minutes. The stirring speed was raised to 3000 rpm, and 3.14 g (18.7 mmoles) of 1,6-hexamethylenediisocyanate was added using a syringe. The mixture was stirred for an additional 10 minutes at 3000 rpm. After these 10 minutes 3.38 g (20.1 mmoles) of 1,6-hexamethylenediisocyanate was added. A mixture of 4.18 g (39.0 mmoles) benzylamine and 8.36 g butylacetate was added to the reactor in 12 minutes using a pump. The mixture was stirred for an additional 5 minutes at 3000 rpm.

Comparative Example 13

S-AMBA+HDI in Setalux 8503 SS-60

100.0 g of Setalux 8503 SS-60 was added in a reactor, and mixed with 0.97 g (8.0 mmoles) S-(−)-α-methylbenzylamine, using a rotating disk dissolver at 1500 rpm for 2 minutes. The stirring speed was raised to 4000 rpm, and 0.69 g (4.1 mmoles) of 1,6-hexamethylenediisocyanate was added using a syringe. The mixture was stirred for an additional 30 seconds at 4000 rpm.

Comparative Example 14

BA+HDI in Setalux 8503 SS-60

100.0 g of Setalux 8503 SS-60 was added in a reactor, and mixed with 0.92 g (8.6 mmoles) benzylamine, using a rotating disk dissolver at 1500 rpm for 2 minutes. The stirring speed was raised to 4000 rpm, and 0.74 g (4.4 mmoles) of 1,6-hexamethylenediisocyanate was added using a syringe. The mixture was stirred for an additional 30 seconds at 4000 rpm and was turbid in nature.

These materials were formulated with a solution of a triacid crosslinker as described earlier. The formulation based on comparative example 14 yielded a Newtonian, clear liquid, indicating that the SCA particles had dissolved. Table 7 below details a comparison of the compliance values of comparative example 15 and example 10 and serves to further illustrate the advantages of the templated SCA over the conventional HDI-BA SCA.

TABLE 7

| Setalux 8503 1.2% SCA 1K Formulation based on: | Compliance after 100 s at 0.5 Pa (1/Pa) |
|---|---|
| Example 10 - Templated 1:1 | 5.5 |
| Comparative Example 13 | Not tested as SCA dissolved: Newtonian fluid |
| Comparative Example 14 | 173 |

Example 11

Falling Wave Experiment

Secondary "falling wave" experiments were conducted as follows comparing templated products based on a first seed of an AMBA (90/10 S/R)—HDI core to which, in a second step, a BA-HDI shell has been added in 2 different ratio of core-to-shell [1:1 and 3:1], to a conventional BA-HDO non-templated SCA based formulation.

a) Sample Templated 1:1

125.0 g of Setalux 1757 VV-70 was added in a reactor, and mixed with 0.07 g of R-(+)-α-methylbenzylamine and 0.60 g S-(−)-α-methylbenzylamine, using a rotating disk dissolver at 1500 rpm for 2 minutes. The stirring speed was raised to 4000 rpm, and 0.53 g of 1,6-hexamethylenediisocyanate was added using a syringe. The mixture was stirred for an additional 30 seconds at 4000 rpm. The stirring speed was reduced to 1000 rpm and after 2 minutes 0.69 g benzylamine was added. The mixture was stirred for an additional 2 minutes at 1000 rpm. A mixture of 0.53 g 1,6-hexamethylene-diisocyanate and 0.53 g Solvesso 100 was added to the reactor in 15 minutes using a pump. The mixture was stirred for an additional 60 seconds at 1000 rpm.

b) Sample Templated 3:1

125.0 g of Setalux 1757 VV-70 was added in a reactor, and mixed with 1.07 g of a 9:1 mixture of R-(+)-α-methylbenzylamine and S-(−)-α-methylbenzylamine, using a rotating disk dissolver at 1500 rpm for 2 minutes. The stirring speed was raised to 4000 rpm, and 0.78 g of 1,6-hexamethylenediisocyanate was added using a syringe. The mixture was stirred for an additional 30 seconds at 4000 rpm. The stirring speed was reduced to 1000 rpm and after 2 minutes 0.35 g benzylamine was added. The mixture was stirred for an additional 2 minutes at 1000 rpm. A mixture of 0.27 g 1,6-hexamethylene-diisocyanate and 0.73 g Solvesso 100 was added to the reactor in 15 minutes using a pump. The mixture was stirred for an additional 60 seconds at 1000 rpm.

Two Formulations were prepared for each of the materials described samples a) and b)—using unmodified Setalux 1757, and Setamine US138 crosslinker (30 wt. % on total solids)—characterized in that the sag control agent were present in the formulations at concentrations of 0.6 or 0.8 wt. % on total solids.

c) Comparative Formulation:

Setalux® 91795 is a commercial formulation (ex Nuplex Resins BV) containing HDI-BA SCA in Setalux 1795. A 1.75 wt. % on total solids formulation ("1K") was prepared based on Setalux® 1760 and Setamine US138 as crosslinker (25 wt % on total solids) and Cylink 2000® (5 wt % on total solids. The 1.75 wt. % SCA level was selected to obtain a similar sag resistance.

All five formulations above were diluted to 61% solids contents and applied to a textured substrate at a film thickness of 40 microns. A flash-off time of 5 minutes was applied with subsequent heating to 140° C. The telegraphed roughness of the substrate during the curing of the film was monitored in the "falling wave" setup, as described in Bosma et al., "The Role of Sag Control Agents in Optimising the Sag/Leveling Balance and a New Powerful Tool to Study This", *Progress in Organic Coatings* 55 (2005) 97-104, the disclosure of which is incorporated herein by reference.

Figure 7:
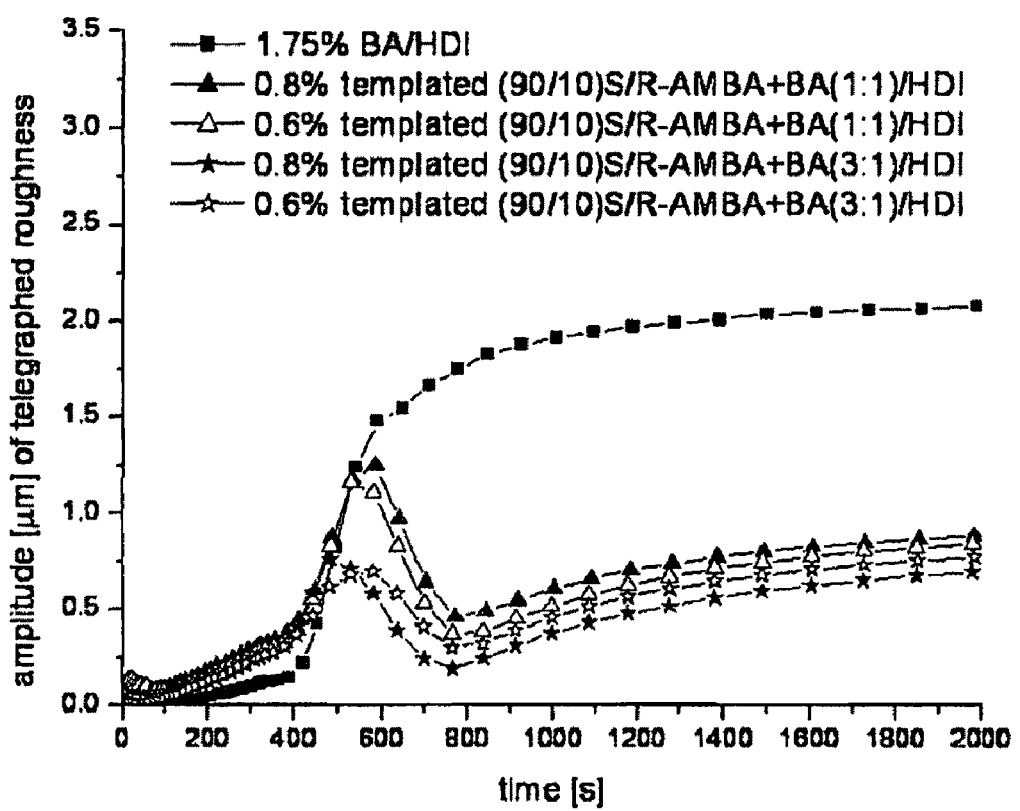
FIG. 7 illustrates the results of a further falling wave test in which the displacements of the original surface profiles of four (differently templated) coatings prepared in accordance with this invention and one prior art coating are followed as a function of time.

The results of this monitoring are shown in FIG. 7. Firstly, it can be seen that the comparative formulation does not show any leveling out of the telegraphed roughness that is seen for the templated examples. Importantly—and with respect to the templated examples—it can also be seen that the telegraphed roughness developing upon shrinkage of the film is leveled out again to a large extent and that this effect is greater for the templated material consisting of a "thinner" HDI-BA urea shell. This example thus indicates that the amount of late stage fluidity introduced can be controlled by the template ratio.

Example 12

Pseudoplasticity Tests

The following samples were prepared:

a) SAMBA-HDI Sample:

100 grams of an experimental carbamate functional resin was added in a reactor. 1.15 grams of S-AMBA was added, and mixed during 2 minutes of high shear mixing. Then, 0.81 gram of HDI was added at 4000 rpm. A strongly viscous paste resulted.

b) HDI-BA Sample:

100 grams of an experimental carbamate functional resin was added in a reactor. 1.57 grams of benzylamine was added, and mixed during 2 minutes of high shear mixing. Then, 1.27 grams of HDI was added at 4000 rpm. A turbid viscous paste resulted.

c) Sample Templated 1:1:

100 grams of an experimental carbamate functional resin was added in a reactor. 0.58 grams of S-AMBA was added, and mixed during 2 minutes of high shear mixing. Then, 0.40 grams of HDI was added at 4000 rpm. After five minutes, 0.54 grams of benzylamine was added, followed by an addition of an HDI/butylacetate mixture (0.44 grams in 1.2 grams) over 6 minutes. The result is a viscous paste.

d) Sample Templated 3:1:

100 grams of an experimental carbamate functional resin was added in a reactor. 0.86 grams of S-AMBA was added, and mixed during 2 minutes of high shear mixing. Then, 0.63 grams of HDI was added at 4000 rpm. After five minutes, 0.29 grams of benzylamine was added, followed by an addition of an HDI/butylacetate mixture (0.22 grams in 0.71 grams) over 6 minutes. The result is a viscous paste.

1K paints were formulated based on these resin samples so as to contain 1 wt. % SCA on total solids. The carbamate resins were formulated with Cymel 303® as crosslinker in a 80/20 solids weight ratio; Nacure 5255 [1% (solids on solids)] was added as a catalyst. Thereinafter the paints were diluted to a high shear viscosity of 0.8 Pa.s.

The rheology of these 1K formulations were tested were tested with a stress controlled rheometer, freshly prepared, but also after standing for 4 weeks. Flow curves were recorded, and the amount of pseudoplasticity (defined here as the ratio of the viscosity at 500 Pa and 1 Pa shear stress) was recorded and compared. From FIG. 8, it can be seen that the SAMBA-HDI sag control agent (SCA) is very efficient when fresh, but deteriorates strongly upon storage for 4 weeks; consequently, this SCA would not be useful in this 1K paint. The conventional HDI-BA exhibits better stability over time, but is not very efficient. The examples given for the templated SCA's combine a high efficiency with a good storage stability, presumably due to the protecting nature of the HDI-BA skin on the SCA particles.

The invention claimed is:

1. A thixotropic agent comprising a first polyurea reaction product of a first polyisocyanate with a first amine, wherein the first amine comprises a monoamine, and a second polyurea reaction product of a second polyisocyanate with a second amine different from the first polyurea reaction product, and wherein the second polyurea reaction product has been precipitated in the presence of colloidal particles of the first reaction product, and wherein the colloid particles of the first polyurea reaction product are anisotropic.

2. The thixotropic agent according to claim 1 wherein said colloidal particles of the first polyurea reaction product have a width of less than 200 nm.

3. The thixotropic agent according to claim 1 wherein the ratio by weight of said first polyurea compound to said second polyurea reaction product is in the range from 20:80 to 80:20.

4. The thixotropic agent according to claim 1 wherein the first polyisocyanate and/or first amine are different from the second polyisocyanate and/or second amine.

5. The thixotropic agent according to claim 1 wherein said first and/or second polyisocyanates are independently selected from the group consisting of substituted or unsubstituted linear aliphatic polyisocyanates and substituted or unsubstituted arylene, aralkylene, and cyclohexylene polyisocyanates.

6. The thixotropic agent according to claim 1 wherein said first and second polyisocyanates are the same.

7. The thixotropic agent according to claim 1 wherein said first amine comprises one or more chiral amines.

8. The thixotropic agent according to claim 7, wherein said first amine comprises one or more mono-amines, which comprise more than 50 mole % chiral amines.

9. The thixotropic agent according to claim 7 wherein said chiral amines comprise a compound defined by the formula (I):

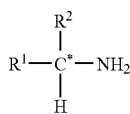

wherein each of $R^1$ and $R^2$ are independently selected from the group consisting of linear or branched, substituted or unsubstituted, saturated or unsaturated hydrocarbyl and a heteroatom containing group, and wherein $R^1$ and $R^2$ are different such that the carbon atom in the amine is a chiral center.

10. The thixotropic agent according to claim 9, wherein $R^2$ is a methyl group.

11. The thixotropic agent according to claim 7 wherein said chiral amines are provided in an enantiomeric excess of greater than 25%.

12. The thixotropic agent according to claim 1 wherein said one or more second amines comprise non-chiral mono-amines.

13. The thixotropic agent according to claim 12, wherein said non-chiral amines comprise a compound defined by the formula (II):

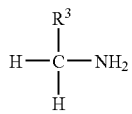

wherein $R^3$ is selected from the group consisting of linear or branched, substituted or unsubstituted, saturated or unsaturated hydrocarbyl and a heteroatom containing group.

14. The thixotropic agent according to claim 13, wherein said first amine comprise one or more chiral amines which comprise a compound defined by formula I:

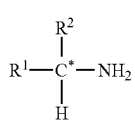

wherein each of $R^1$ and $R^2$ are independently selected from the group consisting of linear or branched, substituted or unsubstituted, saturated or unsaturated hydrocarbyl and a heteroatom containing group, and wherein $R^1$ and $R^2$ are different such that the carbon atom in the amine is a chiral center;
and characterized in that $R^3$ of said non-chiral amines and $R^1$ of said chiral amines are substantially isomorphous.

15. The thixotropic agent according to claim 1 wherein said first and second polyurea reaction products are isomorphous.

16. The thixotropic agent according to claim 1 wherein under equivalent conditions the dissolution temperature of said first polyurea reaction product ($T_{m1}$) is lower than the dissolution temperature than the second polyurea reaction product ($T_{m2}$).

17. The thixotropic agent according to claim 1, comprising a first polyurea reaction product of hexamethylene diisocyanate (HDI) with alpha-methylbenzylamine (AMBA) and a second polyurea reaction product of hexamethylene diisocyanate (HDI) with benzylamine (BA) precipitated in the presence of anisotropic colloidal particles of the said first polyurea reaction product, and wherein the ratio by weight of the said first polyurea reaction product to said second polyurea reaction product is in the range from 20:80 to 80:20.

18. A sag control agent composition comprising a thixotropic agent according to claim 1 dispersed in a binder material.

19. The sag control agent composition according to claim 18, for use as a master batch in the preparation of a coating composition, wherein the composition comprises a binder, a solvent and 0.5 to 7 wt % relative to the total weight of the composition of the thixotropic agent.

20. A coating composition comprising a binder and sag control agent according to claim 18.

21. The coating composition according to claim 20, comprising between 0.05 and 4 wt. percent of the thixotropic agent based on the total weight of the coating composition.

22. A coating prepared from a coating composition according to claim 20.

23. A process for curing a coating composition according to claim 20 comprising heating said composition to a curing temperature ($T_{curing}$) selected such that the curing temperature is greater than the dissolution temperature of the first polyurea reaction product ($T_{curing} > T_{m1}$) but less than the dissolution temperature of the second polyurea reaction product ($T_{curing} < T_{m2}$).

24. A process for the preparation of a thixotropic agent comprising the sequential precipitation of a first polyurea reaction product, obtained by reacting a first polyisocyanate with a first amine, and a second, different polyurea reaction product, obtained by reacting a second polyisocyanate with a second amine and wherein the precipitation of the second polyurea reaction product occurs in the presence of colloidal particles of the first polyurea reaction product and wherein the colloid particles of the first polyurea reaction product are anisotropic.

25. A thixotropic agent obtainable using the process according to claim 24.

26. The thixotropic agent according to claim 1, wherein said colloid particles of the first polyurea reaction product have a length substantially greater than their width.

27. The thixotropic agent according to claim 1 wherein said colloidal particles of the first polyurea reaction product have a width of less than 100 nm.

28. The thixotropic agent according to claim 1 wherein said colloidal particles of the first polyurea reaction product have a width of less than 50 nm.

29. The thixotropic agent according to claim 7, wherein said first amine comprises one or more mono-amines, which comprise more than 80 mole % chiral amines.

30. The thixotropic agent according to claim 7 wherein said chiral amines are provided in an enantiomeric excess of greater than 50%.

31. The thixotropic agent according to claim 7 wherein said chiral amines are provided in an enantiomeric excess of greater than 75%.

32. The thixotropic agent according to claim 1, wherein the ratio of the first polyurea product to the second polyurea product (by weight) is greater than 5:95.

33. The thixotropic agent according to claim 1, further comprising a binder.

* * * * *